(12) United States Patent
Lynch et al.

(10) Patent No.: US 7,666,960 B2
(45) Date of Patent: Feb. 23, 2010

(54) PROCESS FOR THE PRODUCTION OF ETHYLENE COPOLYMERS

(75) Inventors: Michael W. Lynch, West Chester, OH (US); Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 657 days.

(21) Appl. No.: 11/403,296

(22) Filed: Apr. 13, 2006

(65) Prior Publication Data

US 2007/0244275 A1 Oct. 18, 2007

(51) Int. Cl.
*C08F 4/42* (2006.01)
(52) U.S. Cl. ............... 526/128; 526/124.2; 526/124.3; 526/352; 502/103; 502/115; 502/116; 502/118
(58) Field of Classification Search ............... 526/124.2, 526/124.3, 128, 352; 502/103, 115, 116, 502/118
See application file for complete search history.

(56) References Cited

U.S. PATENT DOCUMENTS

| | | | |
|---|---|---|---|
| 4,223,118 A | | 9/1980 | Tsubaki et al. |
| 4,357,448 A | * | 11/1982 | Tsubaki et al. ............... 526/65 |
| 4,464,518 A | | 8/1984 | Iwabuchi et al. |
| 5,021,382 A | | 6/1991 | Malpass, Jr. |
| 5,023,223 A | * | 6/1991 | Ebara et al. ............... 502/116 |
| 5,534,472 A | | 7/1996 | Winslow et al. |
| 5,731,392 A | | 3/1998 | Ali et al. |
| 6,171,993 B1 | * | 1/2001 | Mavridis et al. ............ 502/103 |
| 6,642,326 B1 | | 11/2003 | Meyer et al. |

FOREIGN PATENT DOCUMENTS

EP 0 283 011 9/1988
WO WO 2005/005489 A1 1/2005

OTHER PUBLICATIONS

Kissin, "Kinetics of olefin Copolymerization with Heterogeneous Ziegler-Natta catalysts", Macromol. Symp., 89, 113-123(1995).*
Yau, W.W., et al.: "New Approaches Using MW-Sensitive Detectors in GPC-TREF for Polyolefin Characterization" *Polymer* 42 (2001) 8947-8958.
Shroff, R., et al.: "New Measures of Polydispersity from Rheological Data on Polymer Melts" *J. Applied Polymer Science*, vol. 57: 1605-1626 (1995). John Wiley & Sons, Inc.
Kissin, Y.V.: "Kinetics of Olefin Copolymerization with Heterogeneous Ziegler-Natta Catalysts" *Macromol. Symp.* 89: 113-123 (1995).
Kissin, Y.V.: "Multicenter Nature of Titanium-Based Ziegler-Natta Catalysts: Comparison of Ethylene and Propylene Polymerization Reactions" *J. Polymer Science: Part A: Polymer Chem.*, vol. 41: 1745-1758 (2003).
U.S. Appl. No. 11/180,853, filed Jul. 13, 2005, Reinking, M.

* cited by examiner

*Primary Examiner*—Ling-Siu Choi
(74) *Attorney, Agent, or Firm*—Gerald A. Baracka; Shao-Hua Guo

(57) ABSTRACT

A process for the copolymerization of ethylene and α-olefins which utilizes a mixed modifier comprised of a conjugated diene and alkoxysilane is disclosed.

12 Claims, 2 Drawing Sheets

PROCESS FOR THE PRODUCTION OF ETHYLENE COPOLYMERS

BACKGROUND OF THE INVENTION

1. Field of the Invention

The present invention relates to a process for the production of ethylene-α-olefin copolymers having enhanced short-chain branching characteristics. A mixed modifier comprised of a conjugated diene and an alkoxysilane is employed for the copolymerization.

2. Description of the Prior Art

Various organosilicon compounds have been employed with Ziegler-Natta catalysts as selectivity control agents (SCA's), primarily for the polymerization of propylene and ethylene to modify isotacticity. These processes are discussed in detail in PCT International Publication No. WO 2005/005489 A1 which discloses the use of specific mixtures of SCAs, preferably comprised of three silane compounds, for the polymerization of propylene or mixtures of propylene and ethylene.

U.S. Pat. No. 6,642,326 discloses the use of hydrosilane and polysiloxyhydrosilane modifiers to enhance the activity of boraaryl single-site catalysts.

The addition of tetraalkylorthosilicates to gas phase fluidized bed olefin polymerization reactors is disclosed in U.S. Pat. No. 5,731,392 to control static and thus reduce buildup of polymeric material on the reactor walls.

Copending application Ser. No. 11/180,853, filed Jul. 13, 2005, discloses a 2-step polymerization process for the preparation of copolymers having narrowed short-chain branching distribution using a monotrialkoxysilane compound.

Y. V. Kissin in an article entitled "Kinetics of Olefin Copolymerization with Heterogeneous Ziegler-Natta Catalysts," Macromol. Symp. 89, 113-123 (1995), has studied the effects of independently using arylalkoxysilanes and conjugated dienes with Ziegler-Natta catalysts on the kinetics of ethylene/hexene-1 copolymerizations. The author concludes the arylalkoxysilanes and conjugated dienes poison different active centers in the catalyst. There is no indication by Kissin to the use of silanes and dienes of any type in combination or that any advantage may be realized thereby.

It would be highly advantageous if a method were available to modify the short-chain branching characteristics of ethylene-α-olefin copolymers. It would be even more desirable if such method could be accomplished using known modifiers. These and other advantages are possible with the process of the invention.

SUMMARY OF THE INVENTION

The present invention provides an improved process for the copolymerization of ethylene and α-olefins to produce copolymers having enhanced short-chain branching characteristics. The process utilizes a mixed modifier comprised of two components, namely, a conjugated diene and an alkoxysilane.

More specifically, the process comprises copolymerizing ethylene with a $C_{3-8}$ α-olefin in a hydrocarbon medium in the presence of a mixed modifier comprised of a conjugated diene containing 4 to 12 carbon atoms and an alkoxysilane of the formula $R'_{4-y}Si(OR)_y$ where y is 2 or 3, R is an alkyl group having from 1 to 10 carbon atoms and R' is a $C_{1-10}$ alkyl or $C_{6-10}$ aryl group. The conjugated diene will be present in an amount from about 100 to 5000 ppmw based on the weight of the hydrocarbon medium and the alkoxysilane is utilized in an amount from about 1 to 50 ppmw based on the weight of the hydrocarbon medium.

In a highly useful embodiment of the invention the conjugated diene is selected from the group consisting of 1,3-butadiene, 1,3-pentadiene, 1,3-hexadiene and 2-methyl-1,3-butadiene and the alkoxysilane is a monoalkyltrialkoxysilane or dialkyldialkoxysilane wherein R and R' are $C_{1-6}$ linear or cyclic alkyl groups. Cyclohexylmethyldimethoxy-silane and methyltriethoxysilane are particularly useful alkoxysilanes.

In one highly useful mode of operation, the copolymerization process of the invention is one stage of a two-stage polymerization process wherein the other stage produces substantially ethylene homopolymer. Most preferably, the homopolymerization and copolymerization are performed in series with homopolymer formed in the first reactor and then fed to a second reactor where the ethylene and α-olefin are copolymerized in the presence of the homopolymer and the mixed modifier of the invention.

DETAILED DESCRIPTION OF THE INVENTION

Figure 1:
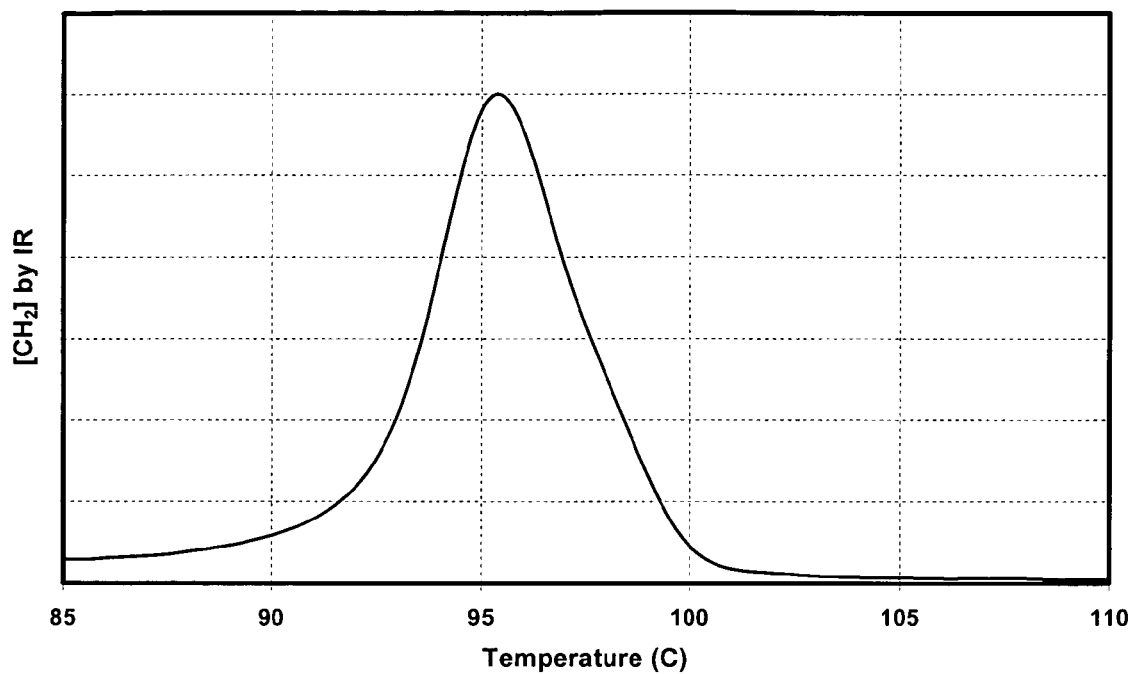
FIG. 1 is the TREF (temperature rising elution fractionation) curve generated for the ethylene-butene-1 copolymer prepared in Example 1 in accordance with the process of the invention.

A process is now provided for the copolymerization of ethylene with one or more α-olefin comonomers and wherein copolymers having modified/enhanced short-chain branching characteristics are produced. As employed herein, the terms modified or enhanced short-chain branching characteristics refers to the degree or amount of short-chain branching (SCB) and/or the distribution of short-chain branches (SCBD) within polymer chains of varying molecular weight. SCB and SCBD are determined using known temperature rising elution fractionation (TREF) procedures. Impact properties and environmental stress crack resistance are known to be influenced by changes in SCB and SCBD.

For the improved process of the invention, ethylene and a $C_{3-8}$ α-olefin are copolymerized utilizing a transition metal catalyst, organoaluminum cocatalyst and mixed modifier. The modifier is a mixture of a $C_{4-12}$ conjugated diene and an alkoxysilane compound. The copolymerization is conducted using known polymerization techniques. These can include gas phase, solution or slurry procedures or polymerizations performed in supercritical media. In one preferred embodiment of the invention a slurry process is employed wherein the copolymerization is carried out in an inert hydrocarbon medium. In another preferred embodiment, the slurry copolymerization is conducted in multiple reactors which may be connected in parallel or in series.

Catalyst systems employed for the copolymerization process are comprised of a transition metal-containing compound and an organoaluminum cocatalyst compound. High activity catalyst systems comprised of a solid transition metal-containing catalyst component and organoaluminum co-catalyst component are particularly useful for the process of the invention.

Solid transition metal-containing catalyst components are obtained by reacting a titanium or vanadium halogen-containing compound with a reaction product preferably obtained by reacting a Grignard reagent with a hydropolysiloxane having the formula

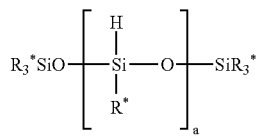

wherein R* represents an alkyl, aryl, aralkyl, alkoxy, or aryloxy group and a is from 1 to 100, preferably from 10 to 50, or a silicon compound containing an organic group and hydroxyl group in the presence or absence of an aluminum alkoxide, aluminum alkoxyhalide halide or a reaction product obtained by reacting the aluminum compound with water.

Organoaluminum cocatalyst compounds useful for the process correspond to the general formula $$AlR^{**}{}_{x}X_{3-x}$$

wherein $R^{**}$ is a $C_1$-$C_8$ hydrocarbon group; X is a halogen or a $C_{1-6}$ alkoxy group; and x is 1, 2 or 3. Representative organoaluminum compounds include triethylaluminum, tributylaluminum, diethylaluminum chloride, dibutylaluminum chloride, ethylaluminum sesquichloride, diethylaluminum ethoxide and the like.

High activity catalyst systems of the above types useful for the copolymerization process of the invention are described in detail in U.S. Pat. Nos. 4,223,118; 4,357,448 and 4,464,518 which are incorporated herein by reference.

The catalyst and cocatalyst are typically dispersed in an inert hydrocarbon and metered into the reactor. Catalyst and cocatalyst levels will vary; however, the catalyst is typically employed at a level of 0.00005 to 0.001 moles transition metal per liter of diluent and the cocatalyst is typically employed at a level of 50-500 ppmw based on the diluent.

Polymerization conditions and procedures employed for the process are conventional, i.e., temperatures can range up to about 300° C. with pressures up to about 4000 psi. Temperatures are more typically maintained at 60° C. to 110° C. and, most preferably, between 65° C. and 85° C. Pressures are most generally between 80 psi and 200 psi and, more preferably, from 80 psi to 160 psi. Hydrogen can be added to control molecular weight.

Inert hydrocarbons used for slurry processes include saturated aliphatic hydrocarbons such as hexane, isohexane, heptane, isobutane and mixtures thereof.

Comonomer to ethylene molar ratios of 0.1:1 to 30:1 and, more typically, 0.5:1 to 20:1 are employed for the production of copolymers in the desired density range. The process is particularly advantageous for the copolymerization of ethylene with butene-1 or hexene-1.

To obtain improved comonomer distribution with the process of the invention a combination of modifiers, namely, a conjugated diene and alkoxysilane, is necessarily employed. The modifiers may be added to the reactor as a mixture or separately to achieve the desired properties. Typically to facilitate addition to the reactor the modifier or modifier combination is added as a solution at a convenient concentration.

Useful conjugated dienes include $C_{4-12}$ aliphatic di-unsaturated hydrocarbons corresponding to the formula $C_nH_{2n-2}$ where n is 4 to 12. Useful alkoxysilanes correspond to the formula $R'_{4-y}Si(OR)_y$ where y is 2 or 3, R is a $C_{1-10}$ alkyl group and R' is a $C_{1-10}$ alkyl group or a $C_{6-10}$ aryl moiety. The alkyl moieties may be linear, branched or cyclic. The conjugated diene is employed in an amount from about 100 to 5000 ppmw and, more preferably, from about 250 to 4000 ppmw with respect to the diluent and the alkoxysilane is employed in an amount from about 1 to 50 ppmw and, more preferably, from about 2.5 to 40 ppmw with respect to the diluent.

Highly useful conjugated dienes for the process include 1,3-butadiene, 1,3-pentadiene, 1,3-hexadiene and 2-methyl-1,3-butadiene, commonly known as isoprene. Other conjugated dienes, such as 1,3,5-undecatriene, may also be used. Butadiene and isoprene are particularly useful.

Monoalkyltrialkoxysilanes and dialkyldialkoxysilanes where R and R' are $C_{1-6}$ linear or cyclic alkyl groups are highly useful alkoxysilane compounds for the process. It is even more advantageous when R and R' are methyl, ethyl or cyclohexyl or combinations thereof. Highly useful alkoxysilanes of this latter type include cyclohexylmethyldimethoxysilane and methyltriethoxysilane.

The invention is suitable for single and multi-stage reactor systems. However, as previously pointed out, the process is particularly useful for multi-stage slurry copolymerizations. In such processes ethylene copolymer is produced in at least one of the reactors. For example, in a commonly practiced 2-stage polymerization process ethylene homopolymer is produced in a first polymerization zone, ethylene-α-olefin copolymer resin is produced in a second polymerization and the products are combined in the desired ratio to obtain a final polyethylene resin product. The polymerizations are preferably conducted in an inert hydrocarbon medium in separate reactors which may be connected in a parallel but are more commonly connected in series. When connected in series, homopolymer produced in the first reactor is fed into the second reactor with the catalyst, solvent and unreacted ethylene where comonomer and additional ethylene are added. In such series-conducted processes, the mixed conjugated diene/alkoxysilane modifier may be added to the first or second reactor or both.

Two-stage processes of the above type are described in U.S. Pat. No. 4,357,448 details of which are incorporated herein by reference. Typically, the same catalyst is used for both polymerizations; however, this is not necessary particularly when the polymerizations are conducted in parallel. When conducted in series, it may be desirable to add additional catalyst to the second reactor and this catalyst may be the same or different than the catalyst employed in the first reactor. Hydrogen may be employed in either or both of the reactors to regulate molecular weight.

In the usual practice of such 2-stage processes, higher density, higher MI predominantly ethylene homopolymer, is produced in the first reactor and lower density, lower MI ethylene/butene-1, ethylene/hexene-1 or ethylene/octene-1 copolymer is produced in the second reactor. To accomplish this, hydrogen to ethylene mole ratios from 1 to 10 are employed in the first reactor whereas hydrogen to ethylene mole ratios from 0.01 to 1 are employed in the second reactor. When operating in series mode, it may be necessary to vent hydrogen prior to transferring the homopolymer in order to achieve the desired hydrogen:ethylene ratio in the second reactor. This can be readily accomplished by means of a flash tank installed between the two reactors.

MI and density of polymer produced in the first reactor will be in the range 1 to 1000 g/10 min and 0.955 to 0.975 g/cm$^3$, respectively, whereas MI and density of copolymer produced in the second reactor will be in the range 0.001 to 10 g/10 min and 0.915 to 0.940 g/cm$^3$, respectively. In a particularly advantageous embodiment of the invention the copolymer produced in the second reactor will have a density of 0.925 to 0.938 g/cm$^3$ and MI from 0.01 to 5 g/10 min.

Using multi-stage processes of the above types, properties of the final polyethylene resin product can be varied depending on (a) the properties of the individual homopolymer and copolymer products produced in the respective reactors and (b) the weight ratio at which the homopolymer and copolymer are combined to form the final product. The copolymer typically constitutes from 35 to 65 wt. % and, more preferably, from 45 to 55 wt. % of the final polyethylene resin product. The final polyethylene resin will, however, generally have a density of 0.925 g/cm$^3$ or above and melt index (MI) less than 100 g/10 min. Densities of the polyethylene resins produced by such process are preferably in the range 0.930 to 0.975 g/cm$^3$ and MIs are preferably in the range 0.001 to 80 g/10 min. Especially useful polyethylene resin products for film, blow molding and extrusion applications have densities from 0.930 to 0.954 g/cm$^3$ and MIs from 0.01 to 2.5 g/10 min. Densities and MIs referred to herein are determined in accordance with ASTM D 1505 and ASTM D 1238-01, condition 190/2.16, respectively.

If the copolymerization is carried out in a single reactor process copolymer products produced preferably have densities of 0.915 to about 0.960 g/cm$^3$ and MIs of 0.01 to about 100 g/10 min.

In addition to the ability to produce copolymers having a wide range of densities and MIs using polymerization processes of the above types, by utilizing the mixed conjugated diene/alkoxysilane modifiers of the invention it is further advantageously possible to enhance the short-chain branching characteristics of the copolymers thus rendering the resins even more useful for certain applications. Improved SCB/SCBD typically results in resins with improvements in toughness properties, such as impact and/or environmental stress crack resistance (ESCR). The ability to produce copolymers having improved ESCR coupled with versatility of the process with regard to the ability to vary density makes it possible to produce resins having improved ESCR/stiffness balance. For example, a resin of higher density exhibits a higher stiffness while the improved SCBD results in a higher ESCR at that density compared to resins produced by the prior art.

Short-chain branching is determined using a temperature rising elution fractionation technique as described by Yau and Gillespie in their article entitled "New Approaches Using MW-Sensitive Detectors in GPC-TREF for Polyolefin Characterization" (Polymer 42 (2001) 8947-8958). TREF procedures utilize a crystallization and redissolution process to separate polymers having different SCB contents. More specifically, the polymer is dissolved in a suitable solvent and injected onto a packed column which is slowly cooled. During the cooling, polymer fractions having different levels of SCB precipitate and coat the packing particles in layers with the most highly branched fraction precipitating out last to form the outermost layer in the column. The column is then subjected to controlled heating and elution where, as the temperature increases with time, the more highly branched molecules elute first followed by molecules having decreasing levels of SCB. By utilizing suitable detection means, typically an infrared detector, the polymer concentration over the elution temperature range can be plotted to provide an SCB distribution curve, i.e., TREF curve.

The breadth and elution temperature of the TREF curve provides an indication of the uniformity SCB distribution. At the same or essentially the same polymer density, a narrower TREF curve indicates more uniform SCB distribution, i.e., the polymer chains of differing molecular weights have more similar amounts of short-chain branching.

Typically for ethylene-α-olefin copolymerizations, Ziegler Natta catalysts produce fairly heterogeneous SCBD. A more uniform SCBD is obtained for the process of the invention which utilizes the mixed modifier. This is clearly illustrated by the following examples wherein ethylene and butene-1 were copolymerized. The examples are provided to illustrate the invention more fully; however, those skilled in the art will recognize variations that are within the spirit of the invention and scope of the claims.

For the examples, ethylene and butene-1 were copolymerized using a slurry semi-batch procedure and a high activity solid transition metal(Ti)-containing catalyst prepared in accordance with Examples 3 and 4 of U.S. Pat. No. 4,464,518. An amount of catalyst to provide about 0.02 mmoles Ti in the reactor was used. The cocatalyst used was triethylaluminum (TEAL).

All of the polymerizations were carried out in a 4 L jacketed reactor connected to a temperature control system. For the runs 1.6 L isobutane, 0.138 mole hydrogen and 1.24 moles 1-butene were added to the reactor. The reactor was then lined out at the desired polymerization temperature and ethylene added to provide a total pressure of 335 psig. At full pressure the TEAL cocatalyst and modifier (if used) were added. Finally the catalyst was injected into the reactor. Reaction time was measured from the point when the catalyst was injected. Polymerization run times were adjusted to produce 110-140 grams polymer.

At the conclusion of each run, the reactor was vented and the copolymer recovered. The polymers were characterized in accordance with the following procedures.

HLMI: ASTM D1238-01

Melt Point and Percent Crystallinity: Differential scanning calorimetery per ASTM D3418-03.

SCB/SCBD: TREF procedure of Yau and Gillespie, ibid.

Molecular Weight: Weight average molecular weight of the copolymer was determined by gel permeation chromatography (GPC) using a Waters GPC2000CVhigh temperature instrument equipped with a mixed bed GPC column (Polymer Labs mixed with B-LS). Samples were prepared by dissolving 6 mg of the resin in 2.75 ml 1,2,4-trichlorobenzene. The mobile phase was used at a nominal flow rate of 1.0 ml/min and temperature of 145° C. Molecular weights were calculated using a narrow polystyrene calibration curve using appropriate Mark-Houwink constants and Waters Empower software. The Mark-Houwink constants, K and alpha, were 0.000374 and 0.728 respectively for polyethylene and 0.0001387 and 0.7 for polystyrene.

ER: Rheological polydispersity, which is derived from rheological measurements performed on polymer melts, is influenced by the amount and type of branching. "ER" is one of the art-recognized measures of rheological polydispersity. Rheological measurements were performed in accordance with ASTM 4440-95a, which measures dynamic rheology data in the frequency sweep mode. A Rheometrics ARES rheometer was used and operated at 190° C. in the parallel plate mode (plate diameter 50 mm) in a nitrogen environment to minimize sample oxidation/degradation with a gap in the parallel plate geometry of 1.2-1.4 mm and strain amplitude of 10%. Frequencies ranged from 0.0251 to 398.1 rad/sec.

ER was determined by the method of Shroff, et al., *J. Applied Polymer Science*, 57 (1995), 1605 (see also U.S. Pat. Nos. 5,534,472 and 6,171,993). Storage modulus (G') and loss modulus (G") were measured. The nine lowest frequency points were used (five points per frequency decade) and a linear equation was fitted by least-squares regression to log G' versus log G". ER was then calculated from:

$$ER = (1.781 \times 10^{-3}) \times G'$$

at a value of G"=5,000 dynes/cm$^2$.

As those skilled in the art will recognize, when the lowest G" value is greater than 5,000 dyn/cm$^2$, the determination of ER involves extrapolation. The ER values calculated then will depend on the degree on nonlinearity in the log G' versus log G" plot. The temperature, plate diameter and frequency range are selected such that, within the resolution of the rheometer, the lowest G" value is close to or less than 5,000 dyn/cm$^2$.

ER data referred to herein are provided only to demonstrate results observed with the copolymers produced in accordance with the process of the invention relative to the control and the comparative resins and are not intended to be limiting since they are generated under a specific set of conditions. Rheological data generated using different conditions, e.g., temperature, percent strain, plate configuration, etc., could result in values which are higher or lower than those reported.

EXAMPLE 1

In accordance with the copolymerization procedure described above, ethylene and butene-1 were copolymerized in accordance with the process of the invention using a mixed modifier comprised of isoprene and cyclohexylmethyldimethoxysilane (CMDS). The isoprene and CMDS were injected separately. The CMDS was dissolved in heptane for injection. The level of the modifiers and cocatalyst in the reactor were CMDS 6.5 ppmw, TEAL 317 ppmw, and isoprene 2833 ppmw (all based on the isobutane solvent wt.). Polymer yield, run time and properties of the copolymer are set forth in Table 1. The portion of the TREF curve generated for the product over the temperature range 85-110° C. which illustrates the improved SCBD is set forth in FIG. 1.

CONTROL EXAMPLE 2

Figure 2:
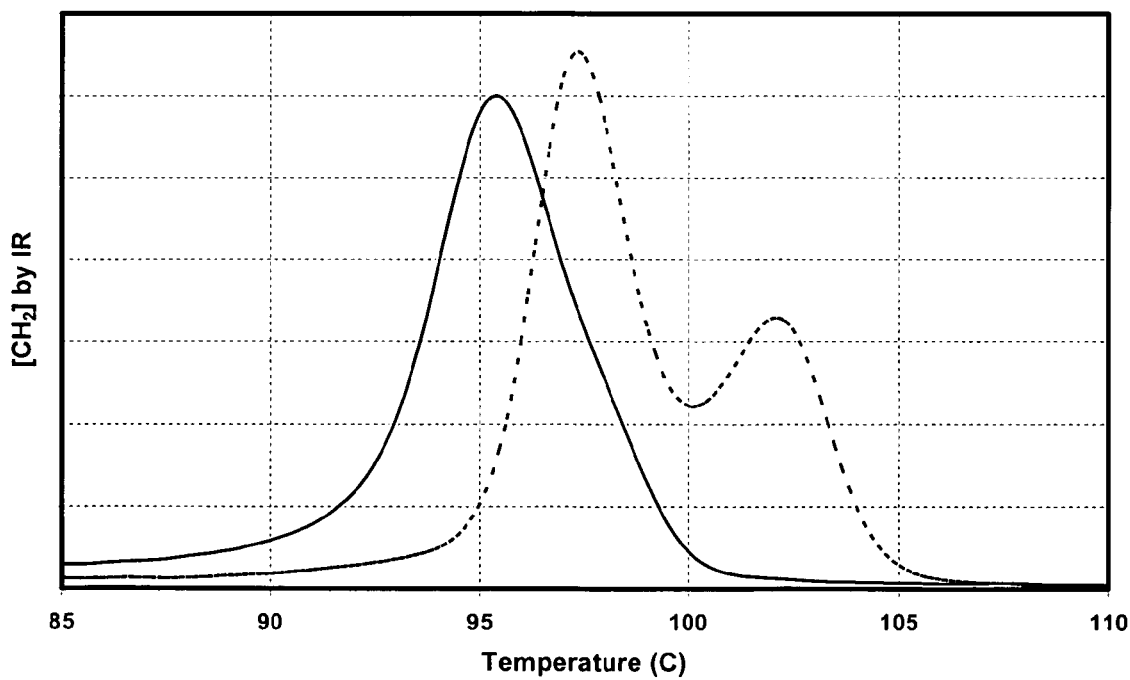
FIG. 2 shows the TREF curve (dashed line) generated for the Example 2 control, i.e., ethylene-butene-1 copolymer prepared using no modifier, with the curve of FIG. 1 (solid line) superimposed thereon.

To demonstrate the significantly improved results of the process of the invention a copolymerization was conducted in the absence of modifier. All of the conditions employed were identical to those of Example 1 except that the mixed modifier was omitted. Polymer yield, run time, and properties of the resulting copolymer product are provided in Table 1. FIG. 2 is a trace of the TREF curve generated over the temperature range 85-110° C. for the control copolymer (dashed line). For the purpose of comparison the TREF curve obtained for the product of Example 1 (solid line) is included in FIG. 2.

COMPARATIVE EXAMPLE 3

Figure 3:
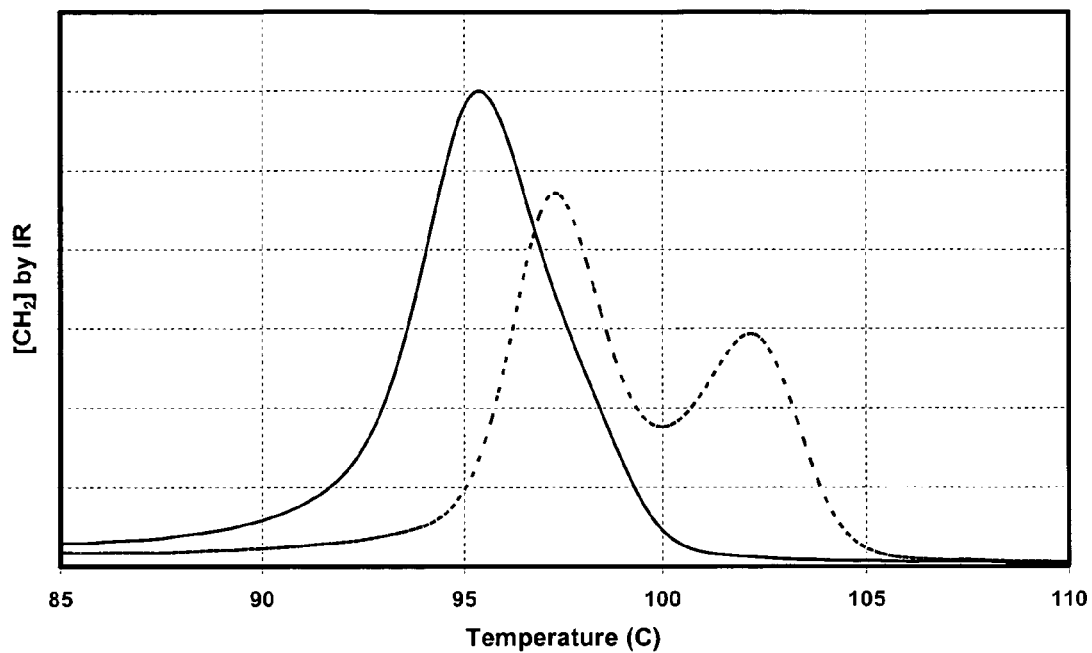
FIG. 3 shows the TREF curve (dashed line) generated for the ethylene-butene-1 copolymer produced in comparative Example 3 using only isoprene as the modifier with the curve of FIG. 1 (solid line) superimposed thereon.

To further demonstrate the significance of the results achieved using the mixed modifiers of the invention, a copolymerization was conducted using only one of the mixed modifier components. For this comparative example, isoprene was used as the sole modifier. Isoprene concentration in the reactor was 2833 ppmw based on the isobutane solvent wt. Catalyst level, cocatalyst level and polymerization conditions were the same as employed for Example 1. Yield of copolymer, run time and properties of the resulting comparative copolymer product are set forth in Table 1. FIG. 3 is a trace of the TREF curve generated over the temperature range 85° C. to 110° C. for this comparative copolymer (dashed line). For the purpose of comparison the TREF curve obtained for the product of Example 1 (solid line) is included in FIG. 3.

COMPARATIVE EXAMPLE 4

Figure 4:
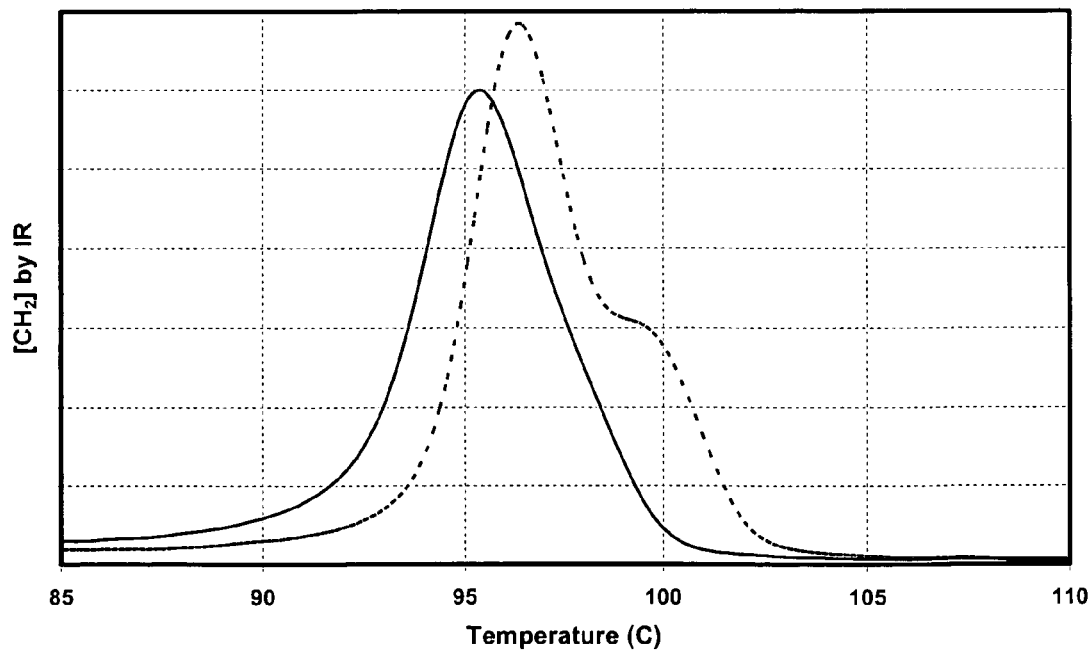
FIG. 4 shows the TREF curve (dashed line) generated for the ethylene-butene-1 copolymer produced in Comparative Example 4 using only the alkoxysilane component as the modifier with the curve of FIG. 1 (solid line) superimposed thereon.

This comparative example was conducted to demonstrate the results obtained when only the alkoxysilane component of the mixed modifier was employed for the copolymerization of ethylene and butene-1. All of the conditions employed were the same as for Example 1 except that CMDS was the sole modifier used. The level of CMDS used was 6.5 ppmw based on the weight of the isobutane solvent. Catalyst and cocatalyst levels were the same as in Example 1. Copolymer yield, run time and properties of the comparative copolymer product are set forth in Table 1. FIG. 4 is a trace of the TREF curve generated over the temperature range 85° C. to 110° C. for the comparative copolymer (dashed line). To demonstrate the different results achieved with the process of the invention, the TREF curve obtained for the copolymer of Example 1 (solid line) is also included in FIG. 4.

TABLE 1

| Product | Yield (g) | Runtime (min) | HLMI | M.P. (° C.) | Percent Crystallinity | ER | Mw |
| --- | --- | --- | --- | --- | --- | --- | --- |
| Ex. 1 | 137 | 196 | 9.3 | 126.1 | 53 | 1.00 | 1.75E+05 |
| Control Ex. 2 | 117 | 136 | 8.0 | 128.2 | 64 | 1.19 | 1.94E+05 |
| Comp. Ex. 3 | 120 | 281 | 22.2 | 125.8 | 53 | 1.15 | 1.47E+05 |
| Comp. Ex. 4 | 113 | 183 | 2.6 | 127.6 | 57 | 0.99 | 2.18E+05 |

Moreover, the ability to modify the SCB characteristics of ethylene-α-olefin copolymers utilizing the mixed modifiers of the invention is readily apparent from a comparison of the TREF curve generated for the copolymer product of the invention (FIG. 1) with the TREF curves obtained from the control (FIG. 2) and the comparative products (FIGS. 3 and 4). Whereas a sharp, symmetrical curve peaking at 95° C. is observed in FIG. 1, the TREF curve obtained for the control produced without modifier had two distinct peaks—one (the stronger) at 97° C. and the other at 102° C. The TREF curve generated for the copolymer produced using only the isoprene modifier (FIG. 3) was positioned and shaped similar to that of the control. The TREF curve for the copolymer produced using only alkoxysilane as the modifier peaked at 97° C. and had a distinct shoulder at about 99° C.

The ability to tailor polymer properties with the inventive method is readily apparent to one skilled in the art from the SCBD data and other data provided.

We claim:

1. In a process for the copolymerization of ethylene with a C$_{3-8}$ α-olefin comonomer utilizing a transition metal-containing catalyst and organoaluminum cocatalyst, to modify short-chain branching characteristics, the improvement comprising conducting the copolymerization in an inert hydrocarbon medium in the presence of a mixed modifier comprised of a conjugated diene containing 4 to 12 carbon atoms and an alkoxysilane of the formula $R'_{4-y}Si(OR)_y$, where y is 2 or 3, R is an alkyl group having from 1 to 10 carbon atoms and R' is a $C_{1-10}$ alkyl or $C_{6-10}$ aryl group; said conjugated diene present in an amount from about 100 to 5000 ppm based on the weight of the hydrocarbon and said alkoxysilane present in an amount from about 1 to 50 ppm based on the weight of the hydrocarbon.

2. The process of claim 1 wherein the conjugated diene is selected from the group consisting of 1,3-butadiene, 1,3-pentadiene, 1,3-hexadiene and 2-methyl-1,3-butadiene.

3. The process of claim 1 wherein R and R' of the alkoxysilane are $C_{1-6}$ linear or cyclic alkyl groups.

4. The process of claim 3 wherein the alkoxysilane is a monoalkyltrialkoxysilane or dialkyldialkoxysilane.

5. The process of claim 4 wherein the alkoxysilane is cyclohexylmethyldimethoxysilane.

6. The process of claim 4 wherein the alkoxysilane is methyltriethoxysilane.

7. The process of claim 1 wherein the conjugated diene is present in an amount from about 250 to 4000 ppmw and the alkoxysilane is present in an amount from about 2.5 to 40 ppmw.

8. The process of claim 1 wherein the copolymerization is conducted as one stage of a multi-stage polymerization process.

9. The process of claim 8 wherein the polymerization stages are conducted in series.

10. The process of claim 9 wherein ethylene is homopolymerized in a first stage and homopolymer produced therein fed to a second stage where the copolymerization is conducted in the presence of said homopolymer and mixed modifier.

11. The process of claim 9 wherein ethylene is copolymerized in a first stage and copolymer produced therein fed to a second stage where further copolymerization is conducted in the presence of said copolymer and mixed modifier.

12. The process of claim 8 wherein the polymerization stages are conducted in parallel.

* * * * *